(12) United States Patent
Krishnamurthy et al.

(10) Patent No.: US 8,903,802 B2
(45) Date of Patent: Dec. 2, 2014

(54) SYSTEMS AND METHODS FOR MANAGING QUERIES

(75) Inventors: Saileshwar Krishnamurthy, Palo Alto, CA (US); Neil Thombre, Santa Clara, CA (US); Neil Conway, Berkeley, CA (US); Wing Hang Li, San Bruno, CA (US)

(73) Assignee: Cisco Technology, Inc., San Jose, CA (US)

( * ) Notice: Subject to any disclaimer, the term of this patent is extended or adjusted under 35 U.S.C. 154(b) by 566 days.

(21) Appl. No.: 12/398,959

(22) Filed: Mar. 5, 2009

(65) Prior Publication Data

US 2009/0228465 A1 Sep. 10, 2009

Related U.S. Application Data

(60) Provisional application No. 61/068,572, filed on Mar. 6, 2008.

(51) Int. Cl.
*G06F 17/30* (2006.01)

(52) U.S. Cl.
CPC .... *G06F 17/30516* (2013.01); *G06F 17/30545* (2013.01); *G06F 17/30445* (2013.01)
USPC .......................................................... 707/713

(58) Field of Classification Search
CPC ................................................ G06F 17/30463
USPC .......................................................... 707/713
See application file for complete search history.

(56) References Cited

U.S. PATENT DOCUMENTS

| | | | | |
|---|---|---|---|---|
| 8,126,870 | B2 * | 2/2012 | Chowdhuri et al. | 707/713 |
| 2007/0078812 | A1 * | 4/2007 | Waingold et al. | 707/707 |
| 2008/0016095 | A1 * | 1/2008 | Bhatnagar et al. | 707/707 |
| 2008/0215531 | A1 * | 9/2008 | Markl et al. | 707/705 |
| 2009/0172674 | A1 * | 7/2009 | Bobak et al. | 718/101 |
| 2009/0210391 | A1 * | 8/2009 | Hall et al. | 707/707 |
| 2009/0228434 | A1 | 9/2009 | Krishnamurthy et al. | |
| 2011/0302164 | A1 | 12/2011 | Krishnamurthy et al. | |

OTHER PUBLICATIONS

Saileshwar, Krishnamurthy, "Shared Query Processing in Data Streaming Systems," University of California, Berkeley, 2006, pp. 1-212.*
Saileshwar, Krishna, "Shared Query Processing in Data Streaming Systems," University of California, Berkeley, 2006, pp. 1-212.*
Saileshwar, Krishna, "Shared Query Processing in Data Streaming Systems," University of California, 2006, pp. 1-212.*

(Continued)

*Primary Examiner* — Robert Beausoliel, Jr.
*Assistant Examiner* — Alexandria Bromell
(74) *Attorney, Agent, or Firm* — Hickman Palermo Truong Becker Bingham Wong LLP

(57) ABSTRACT

A streaming database management system may provide support for creating a new continuous query operator for on-the-fly addition of a new query, e.g., a new SQL query and/or new continuous query operator, into a shared continuous query plan. Alternatively, the streaming database management system may associate the new query on-the-fly with an existing continuous query operator, such as a relational operator and expression evaluator, to reuse the existing continuous query operator. In some embodiments, multiple operators are grouped for on-the-fly addition to the shared continuous query plan. Alternatively, the streaming database management system may identify a group of multiple operators in the shared continuous query plan for reuse by the new query.

17 Claims, 10 Drawing Sheets

(56) References Cited

OTHER PUBLICATIONS

Altinel, Mehmet et al. "Cache Tables: Paving the Way for an Adaptive Database Cache." Proceedings of the 29th VLDB Conference, Berlin, Germany, 2003.
Franklin, Michael J. et al. "Design Considerations for High Fan-in Systems: the HiFi Approach." Proceedings of the 2nd CIDR Conference, Asilomar, California, 2005.
Krishnamurthy, Sailesh et al. "On-the-Fly Sharing for Streamed Aggregation." SIGMOD Conference 2006, Chicago, Illinois, Jun. 27-29, 2006.
Krishnamurthy, Sailesh et al. "The Case for Precision Sharing." Proceedings of the 30th VLDB Conference, Toronto, Canada, 2004.
Krishnamurthy, Sailesh et al. "Shared Hierarachical Aggregation for Monitoring Distributed Streams." Report No. UCB/CSD-05-1381. Computer Science Division, University of California, Berkeley, Oct. 18, 2005.
Chandrasekaran, Sirish et al. "TelegraphCQ: Continuous Dataflow Processing for an Uncertain World." Proceedings of the 1st CIDR Conference, Asilomar, California, 2003.
Krishnamurthy, Sailesh et al. "Telegraph CQ: An Architectural Status Report." Bulletin of the IEEE Computer Society Technical Committee on Data Engineering, Nov. 18, 2003.
Krishnamurthy, Saileshwar. "Shared Query Processing in Data Streaming Systems." A dissertating submitted in partial satisfaction of the requirements for the degree of Doctor of Philoshophy in Computer Science in the graduate division of the University of California, Berkeley. Fall 2006.

* cited by examiner

SYSTEMS AND METHODS FOR MANAGING QUERIES

CROSS REFERENCE TO RELATED APPLICATIONS

This application claims the benefit of U.S. Provisional Application No. 61/068,572, filed on Mar. 6, 2008, titled "On-the-Fly Addition, Shared Evaluation, and Declarative Visualization of Continuous SQL Queries in a Streaming Relational Database Management System," which is hereby incorporated by reference in its entirety.

FIELD OF THE APPLICATION

The present application relates to database management.

SUMMARY

The technology described herein pertains to systems and methods for managing a continuous query in a system that manages streams of data. Managing a continuous query includes folding a new query into a shared continuous query plan. The shared continuous query plan may be used for extracting information from a streaming relational database management system that may include streams and tables. An iterator model plan (IMP) based on the new query and the shared continuous query plan may be analyzed to generate transforms and plan items. The transforms and plan items may be used to generate new continuous query operators in the shared continuous query plan. Alternatively, the plan items may be used to identify existing continuous query operators in the shared continuous query plan (SCP) that may be shared by the new query.

Various embodiments of the technology manage a query by receiving via a computer readable storage medium an IMP based on the query and transforming through the computer readable storage medium an operator of the IMP and an operator variable of the operator based on an analysis of the IMP and a SCP. A continuous query (CQ) operator may be generated based on the transformed operator variable and the transformed operator. The generated CQ operator may be provided to the SCP.

In further embodiments, a query is managed by receiving via a computer readable storage medium an IMP and a local range table based on the query. A query is transformed through the computer readable storage medium an operator variable of an operator in the IMP based on an analysis of the IMP and a SCP. A CQ operator is identified based on the transformed operator variable and the transformed operator. The query may be provided to a list of queries associated with the identified CQ operator.

In further embodiments, a system is provided which includes a processor and a computer readable storage medium. The computer readable storage medium includes instructions for execution by the processor which causes the processor to manage a query. The processor is coupled to the computer readable storage medium. The processor executes the instructions on the computer readable storage medium to receive an IMP based on the query and transform an operator of the IMP and an operator variable of the operator. The transform is based on an analysis of the IMP and a SCP. The processor also executes the instructions to generate a CQ operator based on the transformed operator variable and the transformed operator. The processor also may provide the generated CQ operator to the SCP.

In further embodiments, a system is given for managing a query. The system comprises a processor and a computer readable storage medium. The computer readable storage medium has instructions for execution by the processor which causes the processor to manage a query. The processor is coupled to the computer readable storage medium. The processor executes the instructions on the computer readable storage medium to receive an IMP based on the query and to transform an operator variable of an operator of the IMP. The transform may be based on an analysis of the IMP and a SCP. The processor also executes instructions to identify a CQ operator of the SCP. The CQ operator is configured to receive and execute the query.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

A system that manages a stream of data is called a Streaming Relational Database Management Systems (SRDBMS). A query that is deployed over one or more streams in an SRDBMS is called a continuous query (CQ). As a new tuple enters the SRDBMS, the tuple may be processed using the CQ in order to produce additional data. In some embodiments, a CQ may apply an associated Structured Query Language (SQL) query in turn to each tuple, and concatenate the resulting relations into an output stream. In some embodiments, an input for a CQ includes a database object. In various embodiments, a database object includes a stream, a table, a relation, a view, an archive stream history, and/or the like. A person having ordinary skill in the art will appreciate that this is an exemplary, non-exhaustive list. An output for a CQ may be a stream. A CQ may run continuously until it is halted.

A relational database management system (RDBMS) may be transformed into a SRDBMS. In various embodiments, a SRDBMS is configured to manage and populate streams, tables, and archived stream histories. A SRDBMS may support the evaluation of continuous queries on streams and tables. The SRDBMS may process both continuous queries and static queries, including a full spectrum of CQ operators and SQL operators. The SRDBMS may evaluate multiple concurrent continuous queries using a shared query data structure (which may be referred to as a SCP). The SCP is a data structure that may be scalable and may include one or more CQ operators, each responsive to one or more queries. A shared query evaluation system may be used to process the components of the SCP. An example of a shared query evaluation system is a runtime module. The runtime module may evaluate a tuple using the SCP and a tuple router. The runtime module may also fold continuous queries and/or static queries into the SCP using a plan folding module. The folding process may take place concurrently with processing of the SCP.

The plan folding module may provide support for creating a new CQ operator for on-the-fly addition of a new query (e.g., a new SQL query and/or new CQ) into a SCP. Alternatively, the plan folding module may associate the new query on-the-fly with an existing CQ operator (such as a relational operator and expression evaluator), to reuse the existing CQ operator. In some embodiments, multiple operators are grouped for on-the-fly addition to the SCP. Alternatively, the plan folding module may identify a group of multiple operators in the SCP for reuse by the new query.

Figure 1:
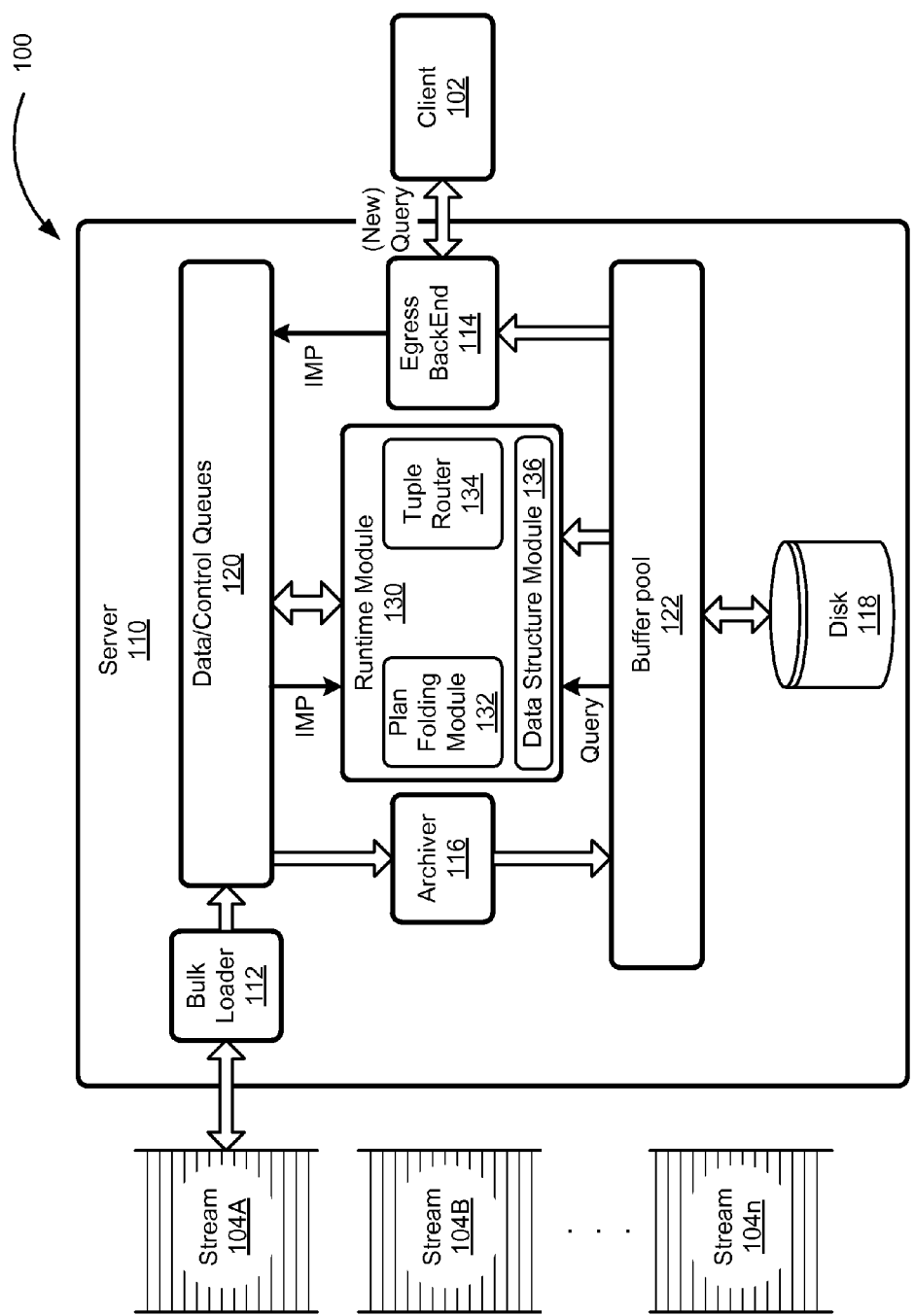
FIG. 1 illustrates a block diagram of an embodiment of a streaming relational database management system.

FIG. 1 illustrates a block diagram of an embodiment of a streaming relational database management system (SRDBMS) 100 in accordance with aspects of the technology. As with all other figures provided herein, FIG. 1 is exemplary only. The system 100 includes a client 102 in communication with a server 110. For simplicity and clarity, only one client 102 is illustrated in FIG. 1. However, a person having ordinary skill in the art will appreciate that multiple clients 102 may communicate with the server 110.

In some embodiments, the server 110 may include a bulk loader 112, an egress backend 114, an optional archiver 116, a disk 118, data/control queues 120, a buffer pool 122, and a runtime module 130. The egress backend 114 may include a planner, a parser, an optimizer, an executor, and/or the like (not illustrated). The buffer pool 122 may be a disk cache. The runtime module 130 includes a plan folding module 132, a tuple router 134, and a data structure module 136. Further details of these elements are provided later herein.

The bulk loader 112 is configured to receive tuples from one or more stream 104A . . . 104n. In some embodiments, the bulk loader 112 receives tuples from a client application (not shown) configured to process streams of data (e.g., stream 104A-104n) and provide the tuples to the bulk loader 112. For simplicity and clarity, only one bulk loader 112 is illustrated in FIG. 1. However, a person having ordinary skill in the art will appreciate that the server 110 may include multiple bulk loaders 112 in communication with multiple streams 104A . . . 104n. In some embodiments, the streams 104A . . . 104n communicate the tuples to the server 110 via a network (not shown). The network may be a local area network, a wide area network, a wireless network, a mobile network, the Internet, the world wide web, a client and/or the like. Vast arrays of information may be accessible via data sources coupled to networks other than Streams 104A . . . 104n. For example, data can be supplied by one or more data sources within a local area network, a wide area network, and/or a mobile network. The bulk loader 112 may provide the tuples received from the streams 104A . . . 104n to the data/control queues 120.

In some embodiments, the bulk loader 112 and the egress backend 114 comprise common code configured to receive data including queries and/or tuples from a client application. The common code may be referred to as a bulk loader 112 when receiving tuples. The common code may be referred to as an egress backend 114 when receiving a query.

The data/control queues 120 may be configured to receive tuples from the bulk loader 112 and/or the runtime module 130. The data/control queues 120 may provide the received tuples to the archiver 116, the runtime module 130, and/or the egress backend 114. For example, data/control queues 120 may provide the tuples received from the bulk loader 112 and/or the runtime module 130 to the archiver 116 for storage on the disk 118. The data/control queues 120 may also retrieve the tuples from the bulk loader 112 and provide them to the runtime module 130 for processing.

In some embodiments, the data/control queues 120 and the buffer pool 122 both occupy shared memory. However, they may serve different functions. For example, the buffer pool 122 may function as a disk cache configured to store and retrieve data from tables (e.g., on the disk 118). Thus, the archiver 116 may write data to the disk 118 via the buffer pool 122. However, the buffer pool 122 may be separate and distinct from the data/control queues 120.

The disk 118 may be a computer readable medium configured to store data. Computer readable storage media may include a hard disk, random access memory, read only memory, an optical disk, a magnetic disk, virtual memory, a network disk, and/or the like. Data may include tuples, tables, variables, constants, queries, continuous queries, programs, IMPs, SCPs, and/or the like. The disk 118 may also store instructions for execution by a processor (not shown), which causes the processor to manage a query. In various embodiments, instructions for execution on the processor include instructions for implementing the bulk loader 112, the egress backend 114, the archiver 116, the data/control queues 120, the buffer pool 122, and/or the runtime module 130 (including the plan folding module 132, the tuple router 134, and the data structure module 136).

The egress backend 114 may receive a query from the client 102. In various embodiments, the query is a CQ or a static query. Optionally, the query received from the client 102 is a new query. The egress backend 114 is configured to process the new query using a planner, a parser, an optimizer and/or an executor. In some embodiments, the egress backend 114 provides an IMP to the data/control queues 120. The data/control queues 120 may provide the IMP to the runtime module 130. The plan folding module 132 of runtime module 130 is configured to fold the received IMP into a SCP in the data structure module 136. Alternatively, the data/control queues 120 may store the IMP on the disk 118 (e.g., via the archiver 116 and the buffer pool 122) for later use.

In some embodiments, the data/control queues 120 receives database objects (such as streams, tables, relations, views, and/or the like) and provides the database objects to the buffer pool 122 via the archiver 116. The buffer pool 122 may store the database objects on the disk 118. The data/control queues 120 may provide the database objects to the runtime module 130. Optionally, the data/control queues 120 provide multiple objects to the runtime module 130 at the same time. For example, the data/control queues 120 may provide tuples from two or more streams 104A . . . 104n and a table to a SCP in the data structure module 136 of the runtime module 130.

The runtime module 130 is configured to receive tuples and/or tables from the data/control queues 120. The runtime module 130 may evaluate the tuples and/or tables using the tuple router 134 and the data structures in the data structure module 136. In various embodiments, the runtime module 130 outputs streams, tables, and/or data to the data/control queues 120. The data/control queues 120 may communicate output from the runtime module 130 to the client 102 via the egress backend 114. For example, the data/control queues 120 may receive a tuple from the runtime module 130 and provide the tuple to the archiver 116. The archiver 116 may provide the tuple to the buffer pool 122. The buffer pool 122 may provide the tuple to the egress backend 114. The egress backend 114 may provide the tuple to the client 102. Alternatively, the buffer pool 122 may provide the tuple to the disk 118. Thus, the data/control queues 120 may store output from the runtime module 130 onto the disk 118 via the archiver 116 and the buffer pool 122.

Various kinds of objects (e.g., tables or views) behave like relations in a traditional RDBMS. Objects that behave like streams may be used in the SRDBMS 100. In various embodiments, a stream (e.g., the streams 104A ... 104n) is classified as a raw stream or derived stream. The classification may be based on how the stream is populated. A raw stream may be populated by an external data provider. In some embodiments, the external data provider connects to the server 110 using a secure and well-defined protocol that authenticates itself, and advertises the identity of the stream being populated. If authorized, the provider may provide data tuples that are appended to the stream. In practice, a data provider will use a call-level API that the SRDBMS provides.

A produced stream may be defined using a query (e.g., a defining query) and may be populated by the SRDBMS 100. A produced stream may be one of multiple types of database objects, including a view and a derived stream. A view may be a database object that is defined using a query and has macro semantics. A view may be defined using a CQ as a streaming view. A view may be used in another query in a place that a raw stream can be used. A defining query of a view runs only when a query that uses the view runs as well.

In some embodiments, a derived stream is a materialized CQ that may be associated with a stream using a special syntax (e.g., CREATE STREAM . . . AS query). The associated stream is similar to a view and may be used in another query in a place that a raw stream can be used. Unlike a view, however, a derived stream does not have macro semantics. A derived stream may be active, whether or not it is used in another active query. A raw stream and/or a derived stream may be stored on the disk 118, as discussed elsewhere herein. For example, a raw stream and/or a derived stream may be archived using the archiver 116 for storing on the disk 118.

In some embodiments, the runtime module 130 receives a query from the disk 118 via the buffer pool 122. The runtime module 130 may also receive various kinds of objects (e.g., a stream, a data table, metadata, tuples, views, relations, expressions, and/or the like) from the buffer pool 122. These objects may be received by the buffer pool 122 from the disk 118 and/or the archiver 116.

Figure 2:
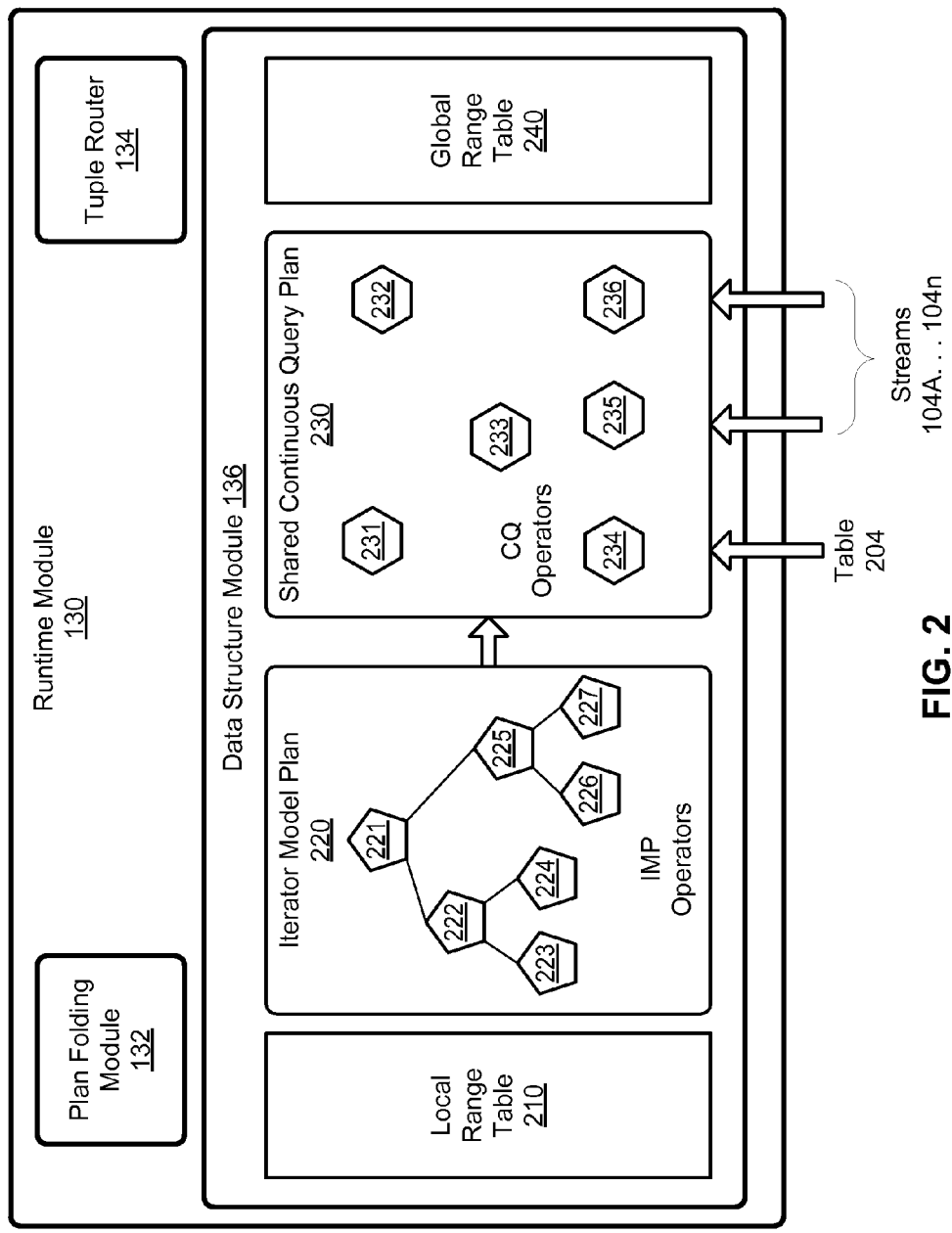
FIG. 2 illustrates a block diagram of a runtime module of the system shown in FIG. 1.

FIG. 2 illustrates a block diagram of the runtime module 130 of the system 100 shown in FIG. 1. Like numbered elements throughout this document refer to like elements. The data structure module 136 includes data structures. Examples of data structures include a SCP 230, a global range table 240, an IMP 220, and an optional local range table 210. The tuple router 134 may route tuples through the SCP 230 using the global range table 240. The IMP 220 and the local range table 210 are based on a query. The plan folding module 132 may fold the IMP 220 and the local range table 210 into the SCP 230.

The runtime module 130 may receive the local range table 210 and the IMP 220 from the egress backend 114 (FIG. 1) via the data/control queues 120. The runtime module 130 may also retrieve a query associated with a database object (such as a streaming view or a derived stream) from the disk 118 via the buffer pool 122. The retrieved query may then be compiled into the IMP 220 and the local range table 210.

The IMP 220 includes IMP operators (e.g., IMP operators 221-227) arranged in a tree structure. Each node of the tree structure may include an operator or a group of operators (illustrated elsewhere herein). The leaves of the tree structure (e.g., IMP operators 223, 224, 226, and 227) may be scan operators configured to fetch records or tuples from data sources. The terms records and tuples may be used interchangeably. Data sources may include heap and index files located on attached storage (e.g. the data/control queues 120, the buffer pool 122, and the disk 118). Operators in the IMP 220 may include unary (e.g., aggregate), binary (e.g., joins), and n-ary operators (e.g., union).

In various embodiments, the new query may be received from the client 102 or the disk 118. In some embodiments, the optimizer of the egress backend 114 (FIG. 1) generates the IMP 220 based on the new query. The IMP 220 may be produced after parse and rewrites phases. The IMP 220 may be provided to the data structure module 136 for evaluation using the plan folding module 132. Alternatively, the IMP 220 and the local range table 210 may be stored on the disk 118 and provided to the runtime module 130 and the data structure module 136 (e.g., via the buffer pool 122). In some embodiments, the client 102 provides the IMP 220 and the local range table 210 to the runtime module 130 and data structure module 136 (e.g., via the egress backend 114 and the data/control queues 120).

The SCP 230 includes CQ operators 231-236. Tuples may be processed by the tuple router 134 using the SCP 230. The SCP 230 is similar to the IMP 220 in that both data structures represent dataflow operations. However, the SCP 230 may differ from the IMP 220 in a number of ways that set them apart. For example, the SCP 230 may be represented as a directed acyclic graph (DAG), instead of a tree of operators that is typically used to represent the IMP 220. The SCP 230 may be used to produce and process CQ tuples that include a combination of individual base tuples and metadata. In some embodiments, the metadata includes book-keeping that can be used for sharing.

The tuple router 134 may push CQ tuples through the SCP 230 from lower level leaf CQ operators (e.g., CQ operators 234-236) to higher level (downstream) CQ operators (e.g., CQ operators 231-233). The SCP 230 may allow for adaptive CQ tuple routing and may accommodate multiple different routes for data. In other words, multiple CQ tuples that are produced by the same CQ operator (i.e., have the same signature) may take different paths through subsequent CQ operators. The SCP 230 may accommodate changes to the structure of the SCP 230 (e.g., query addition, query sharing, and/or query removal) made by the plan folding module 132.

CQ operators (e.g., CQ operators 231-236) may bear a superficial similarity to IMP operators (e.g., IMP operators 221-227). However, CQ operators also may include differences that set them apart from IMP operators. For example, the SCP 230 is "push" based. That is, a CQ operator may be called along with an input base tuple and/or an input CQ tuple for processing. This is different from an IMP operator that is called with no inputs. The IMP operator receives tuples from its children for processing.

Another difference between a CQ operator and an IMP operator is that a CQ operator may output a set of output CQ tuples as a result of processing an input tuple. The tuple router 134 may send each output CQ tuple of the set to one or more downstream CQ operators. This may be accomplished by having the CQ operator pass each output CQ tuple to a tuple router 134. The tuple router 134 is configured to send each output CQ tuple to the one or more downstream CQ operator for evaluation. An IMP operator, on the other hand, has only one parent IMP operator and outputs a tuple to the parent IMP operator as a result of a call from the parent IMP operator.

Yet another difference between a CQ operator and an IMP operator is that a CQ operator may be shared among two or more different queries. The shared CQ operator may include a list of queries that share the CQ operator. The shared CQ operator may support methods for adding a query to the list and/or removing a query from the list, on-the-fly. The plan folding module 132 may be used to add a query to the query list.

In some embodiments, a CQ operator (e.g., CQ operators 231-236) implements functions including
- init( ): Initialize the CQ operator;
- exec(CQTuple*): Execute the CQ operator;
- add_query( ): Add a query to the CQ operator;
- remove_query( ): Remove a query from the CQ operator; and
- end( ): Destroy the CQ operator.

The SCP 230 may receive one or more tuples from one or more streams 104A . . . 104n. The SCP 230 may receive one or more tuples from one or more tables (e.g., table 204). Exemplary FIG. 2 illustrates the SCP 230 receiving tuples from two streams and one table. However, the SCP 230 may receive tuples from one stream or from more than two streams. Likewise, the SCP may receive the tuples from more than one table. The SCP 230 may receive tuples from streams and tables at the same time.

Figure 3:
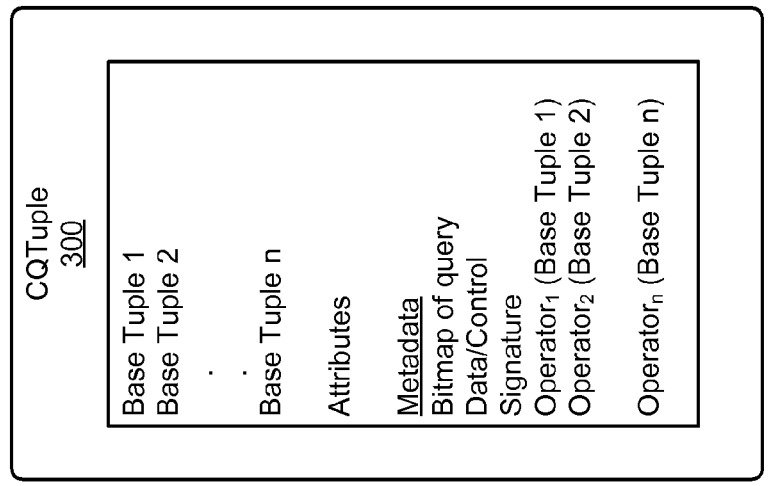
FIG. 3 illustrates a block diagram of a continuous query tuple.

FIG. 3 illustrates a block diagram of a continuous query (CQ) tuple 300. The CQ tuple 300 may include one or more base tuples (e.g., base tuple 1, base tuple 2, . . . base tuple n). Base tuples may be tuples received from a stream (e.g., streams 104A . . . 104n) or a table 204. The CQ tuple 300 may include attributes (e.g., a CQTIME) and one or more variables. A designated "timestamp" attribute of a stream may be identified using a CQTIME constraint having syntax that is similar to that of NOT NULL and/or UNIQUE constraints for defining tables. In various embodiments, a CQTIME stream attribute has an ordinal type that is one of SMALLINT, INTEGER, BIGINT, TIMESTAMP, and TIMESTAMPTZ. In some embodiments, the values of the CQTIME attribute are monotonically increasing for newer tuples that arrive in the stream.

The CQ tuple 300 may include metadata associated with book-keeping for sharing. Examples of metadata include a bitmap of a query, data/control, and a signature. The signature of the CQ tuple 300 may be a composite key. The composite key may include an entry for each constituent base tuple, where each entry uniquely identifies a CQ operator that produced the associated base tuple. For example, referring to FIG. 3, operator 1, operator 2, . . . operator n produced base tuple 1, base tuple 2, . . . base tuple n, respectively. A CQ tuple that includes a signature comprising a composite key may also be referred to as a composite CQ tuple.

The runtime module 130 may receive the base tuple 1 . . . base tuple n via the data/control queues 120 (e.g., from one of the streams 104A . . . 104n, the disk 118, or the client 102), as described elsewhere herein. The runtime module 130 may construct the CQ tuple 300 from the base tuple 1 . . . base tuple n. In some embodiments, the data/control queues 120 may receive the CQ tuple 300 from the SCP 230 in the runtime module 130. In some embodiments, the metadata is received by the runtime module 130 from the buffer pool 122.

Figure 4:
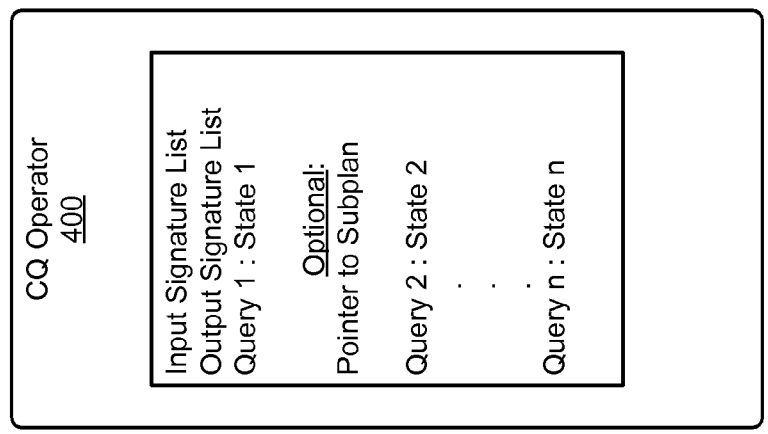
FIG. 4 illustrates a block diagram of a continuous query operator.

FIG. 4 illustrates a block diagram of a continuous query (CQ) operator 400. A SCP (e.g., the SCP 230 of FIG. 2) may include one or more CQ operators 400 (e.g., CQ operators 231-236). The CQ operator 400 may include an input signature list, an output signature list, and a query list. The query list includes at least one query (e.g., query 1) and a state associated with the query (e.g., state 1). The CQ operator 400 may be shared amongst multiple queries. Thus, queries may be added to the query list and/or removed from the query list on the fly. The CQ operator 400 optionally includes query 2 . . . query n. Query 2 . . . query n are associated with state 2 . . . state n, respectively. Optionally, the CQ operator 400 includes a pointer to a sub-plan.

Figure 5:
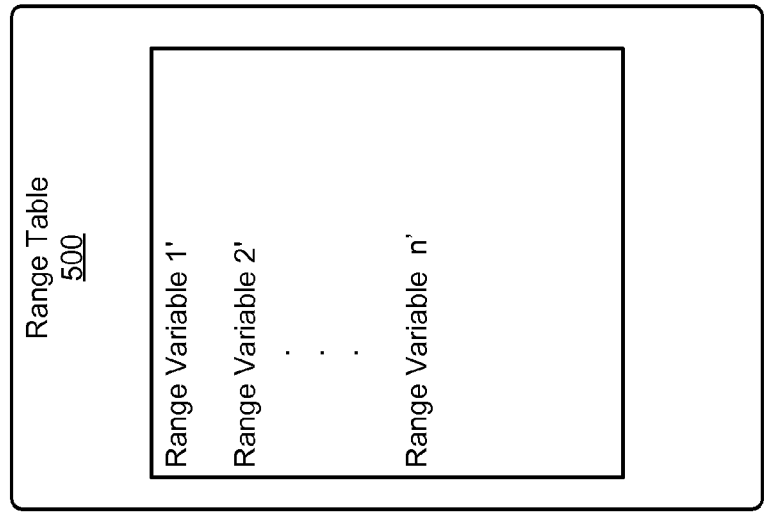
FIG. 5 illustrates a block diagram of a range table.

FIG. 5 illustrates a block diagram of a range table 500. Examples of the range table 500 include the local range table 210 in FIG. 2. Another example of the range table 500 includes the global range table 240 in FIG. 2. The range table 500 includes information for identifying relations and streams that are referenced in a plan (e.g., the IMP 220 and/or a SCP 230). In some embodiments, the range table 500 includes a list of range variables. Each of the range variables may uniquely identify a table, a stream, a function, a sub-query, and/or the like. For example, the local range table 210 may identify relations and streams from various different queries that the IMP 220 references. Similarly, the global range table 240 may identify relations and streams from various different queries that the SCP 230 references.

Figure 6:
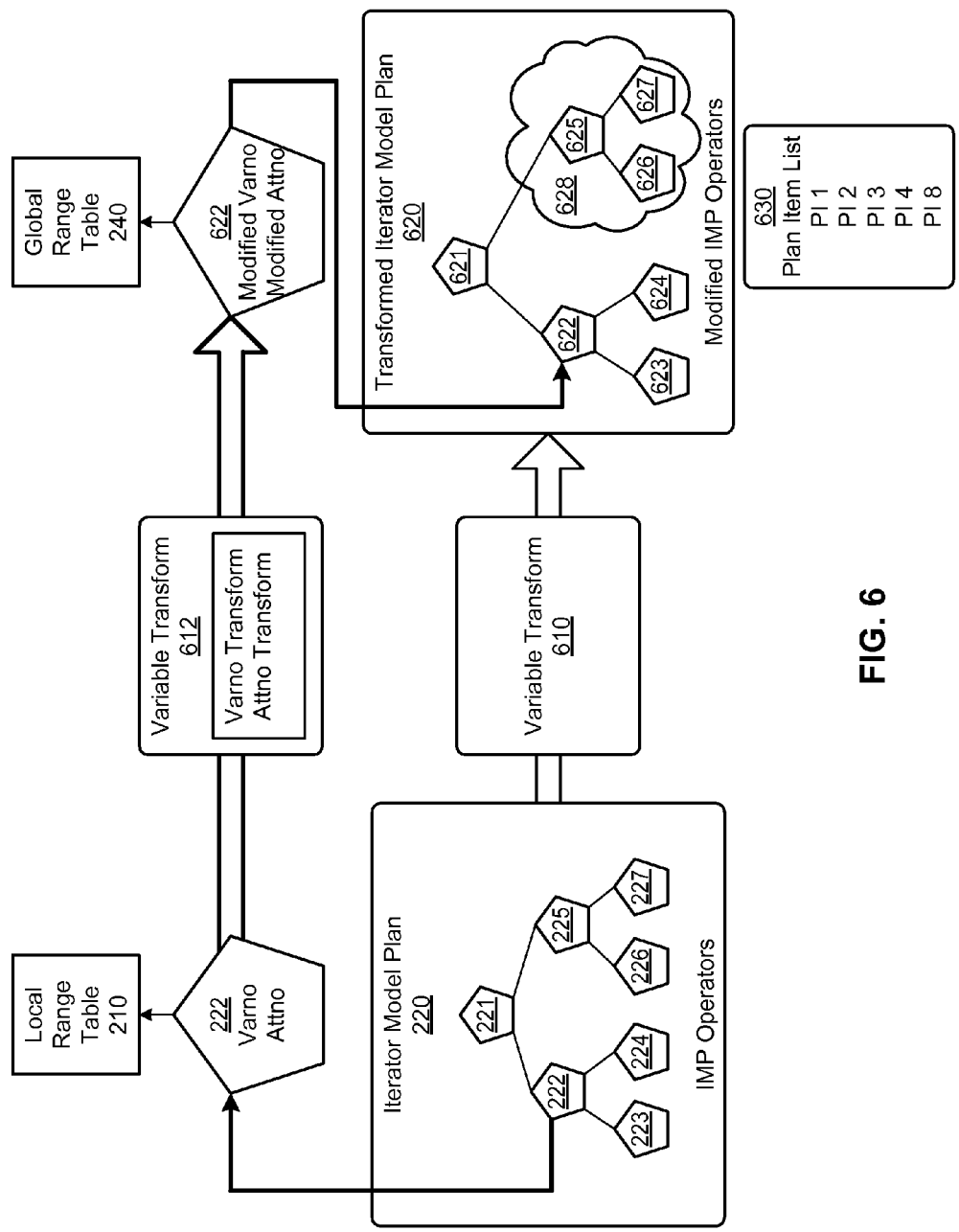
FIG. 6 illustrates a block diagram of a variable transform for iterator model plan operators.

FIG. 6 is a block diagram illustrating an application of a variable transform 610 to iterator model plan (IMP) operators (e.g., IMP operators 221-227). The plan folding module 132 in the runtime module 130 is responsible for generating the variable transform 610 for one or more IMP operators 221-227. When the server 110 receives a new query (e.g., from the client 102), the plan folding module 132 may analyze the IMP 220 and the SCP 230. The analysis may be based on the local range table 210 and/or the global range table 240. The plan folding module 132 generates the variable transform 610 based on the analysis.

The plan folding module 132 may use the variable transform 610 to transform the IMP 220 and generate a transformed IMP 620. The plan folding module 132 may apply the variable transform 610 to each of the IMP operators 221-227 to generate modified IMP operators 621-627, respectively. While the IMP operators 221-227 are transformed, the structure of the IMP 220 remains unchanged. Thus, the structure of the IMP 220 is the same as the structure of the transformed IMP 620. That is, the IMP operators 221-227 are in the same positions in the tree structure as the modified IMP operators 621-627, respectively.

FIG. 6 further illustrates a transform of a representative IMP operator 222 using a variable transform 612. The variable transform 612 is a portion of the variable transform 610. The variable transform 612 may be used to transform operator variables such as a varno and an attno in the IMP operator 222. The variable transform 612 may include a varno transform configured for transforming the varno operator variable into a modified varno operator variable. The variable transform 612 may also include an attno transform configured for transforming the attno operator variable into a modified attno operator variable. A modified IMP operator 622 may include the modified varno and attno operator variables. However, the modified IMP operator 622 may also include unmodified expressions from the IMP operator 222.

The varno field of an operator variable may be used to identify a range variable (e.g., in a local and/or global range table). The attno field of an operator variable may be used to identify an attribute number. For example, the varno may identify a range variable in the local range table 210 that describes a specific table or stream referenced by the range variable. The attno may represent an attribute number of this varno in that relation. The modified varno may identify a range variable in the global range table 240 that describes a specific table or stream referenced by the range variable. The modified attno may represent an attribute number of the modified varno in that relation.

In some embodiments, the plan folding module 132 analyzes the varno and attno operator variables for each of the IMP operators 221-227 in the IMP 220. In the analysis, the plan folding module 132 may analyze the IMP 220 starting with the leaf operators (e.g., IMP operators 222, 224, 226, and 227) and moving on to parent operators (e.g., IMP operators 222 and 225) of the leaf operators and so on. This may be referred to as analyzing (traversing) the IMP 220 from the bottom up or a bottom-up analysis. The plan folding module 132 may generate the variable transform 610 based on this analysis of the IMP 220. The components of the variable transform 610 may include a varno transform and/or an attno transform for each of one or more of the IMP operators 221-227.

While the varno and attno are local to the new query in the IMP 220, they may be transformed for use with the SCP 230. For example, the varnos and attnos of the IMP operators 221-227 may be transformed to ensure that there are no conflicts and collisions across queries represented by query lists in the CQ operators in the SCP 230. The modified varno may provide indexes into a CQ tuple to reference a constituent base tuple. The modified attno may identify a specific attribute in the base tuple.

During the analysis of the IMP 220 and the SCP 230, the plan folding module 132 may identify a related group of modified IMP operators (e.g. modified IMP operators 625-627). The related group of modified IMP operators 625-627 may be represented by a sub-plan 628 that includes the modified IMP operators 625-627. The sub-plan 628 may remain coupled to IMP operator 621 via modified IMP operator 625, as illustrated in FIG. 6. A group of modified IMP operators 625-627 in the sub-plan 628 that are thus coupled may be described as rooted at operator 625.

The plan folding module 132 also generates a plan item list 630 based on the analysis of the IMP 220 and the SCP 230. The exemplary plan item list 630 includes plan items PI 1-4 and 8. One or more of the plan items PI 1-4 may be used for creating a new CQ operator based on an IMP operator (e.g., IMP operators 621-623). Alternatively, one or more of the plan items PI 1-4 may be used for sharing an existing CQ operator in the SCP 230 based on an IMP operator (e.g., the modified IMP operator 624).

The plan item list 630 may include a plan item PI 8 associated with the sub-plan 628. The plan item PI 8 may be used to identify the sub-plan 628. The plan item PI 8 may be used for sharing an existing sub-plan (not shown) in the SCP 230 based on the sub-plan 628. Alternatively, the plan item PI 8 may be used for creating the new sub-plan 628 in the SCP based on the sub-plan 628. The new sub-plan 628 may be rooted at the modified IMP operator 625.

Figure 7:
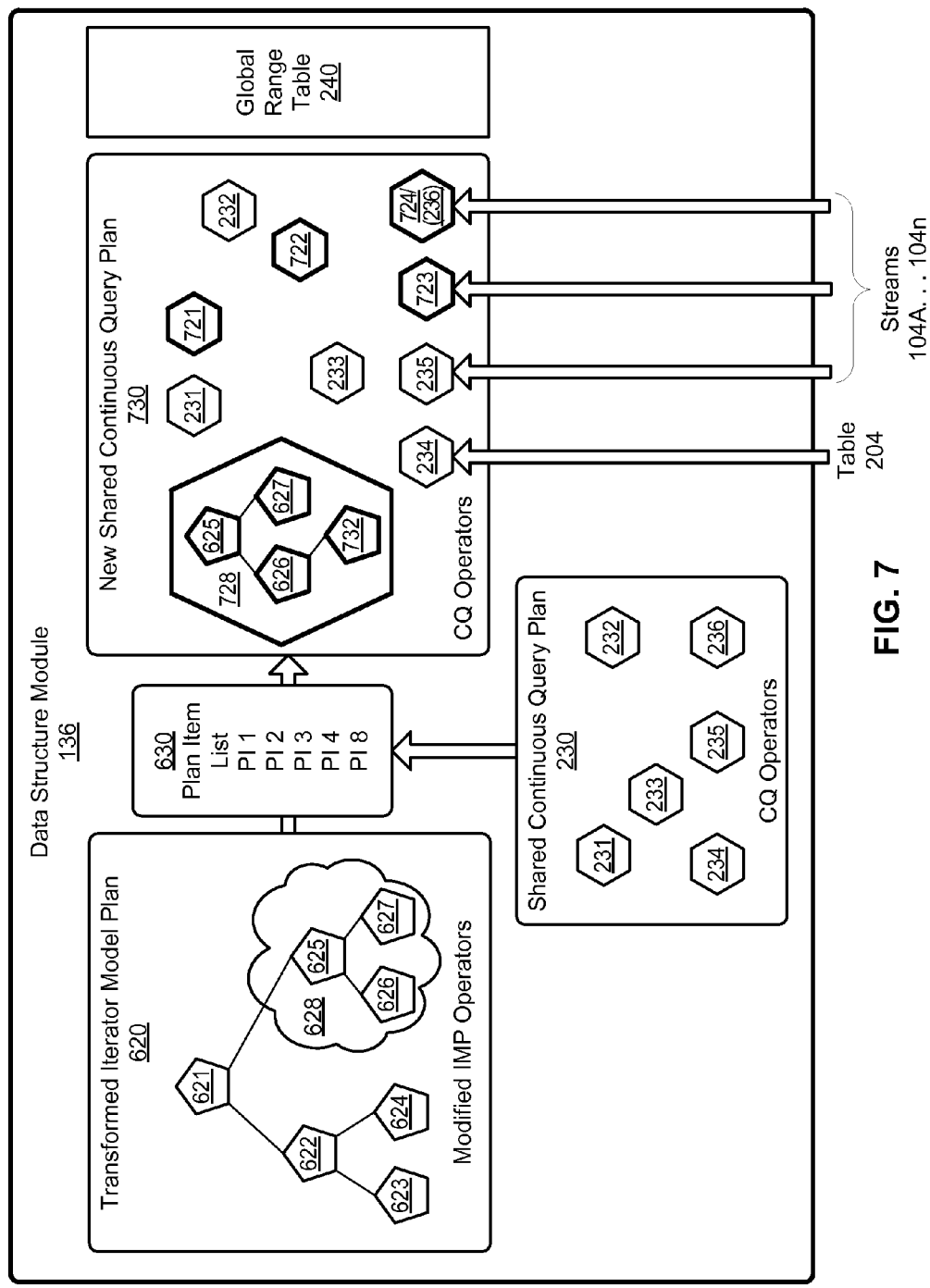
FIG. 7 illustrates folding of the iterator model plan into a shared continuous query plan.

FIG. 7 illustrates a folding of the IMP 220 into the SCP 230. The local range table 210 may be discarded after the IMP 220 has been analyzed. The plan folding module 132 may use the transformed IMP 620 and the plan item list 630 to fold the new query into the SCP 230 and produce a new SCP 730. For each modified IMP operator 621-624, the plan items PI 1-4 represent, respectively, stubs of information. The information stubs may be used either to determine what is to be added to a CQ operator already existing in the SCP 230, or what is to be added to a new CQ operator for the SCP 230. For example, plan item PI 1 may be applied the modified IMP operator 621 to generate a new CQ operator 721. Likewise, plan items PI 2 and 3 may be applied to the modified IMP operators 622 and 623, respectively, to generate new CQ operators 722 and 723, respectively.

In another example, the plan item PI 4 may be applied to the existing CQ operator 236 to share the new query based on the modified IMP operator 624. That is, the new query is added to the query list in the CQ operator 236 in order to generate a shared CQ operator 724. The shared CQ operator 724 is an example of the existing CQ operator 236 including the addition of the new query to the query list of CQ operator 236.

The plan folding module 132 may apply the plan item PI 8 to the sub-plan 628 to create a new CQ operator 728. The CQ operator 728 includes the IMP sub-plan 628. The IMP sub-plan 628 may include modified IMP operators 625-627. The structure of the modified IMP operators 625-627 in the CQ operator 728 is the same as in the IMP sub-plan 628. The CQ operator 728 may receive tuples from the tuple router 134 and may provide tuples to the tuple router 134 in the similar manner as other CQ operators (e.g., CQ operators 231-235 and 271-274). However, internally to the CQ operator 728, the modified IMP operators 625-627 may process the received tuples as an IMP sub-plan. For example, the CQ operator 728 may receive a tuple from the tuple router 134 and the modified IMP operators 626 and/or 627 may process the received tuple. The modified IMP operator 625 may receive the processed tuple from the modified IMP operator 626 and/or the modified IMP operator 627 and perform a further process on it. The CQ operator 728 may provide the further processed tuple from the modified IMP operator 625 to the tuple router 134. The CQ operator 728 may be referred to as rooted in the top level modified IMP operator 625 that provides the output tuple.

In some embodiments, an optional adapter IMP operator 732 may be added to the IMP sub-plan 628 (i.e., modified IMP operators 625-627). The adapter IMP operator 732 modifies the sub-plan 628 and may be a child of the modified IMP operator 62, as illustrate in FIG. 7. The adapter IMP operator 732 may serve as a data structure for the IMP sub-plan 628 to allow the sub-plan to interoperate with the CQ operator 728. Alternatively, the plan item PI 8 may be applied to the sub-plan 628 to share an existing CQ subquery (not illustrated).

The adapter IMP operator 732 is an IMP operator. The adapter IMP operator 732 may serve as a way to bridge the CQ operator 728 and the IMP sub-plan 628. In some embodiments, the adapter IMP operator 732 fetches a CQ tuple from the CQ operator 728 and delivers the CQ tuple to its parents (e.g., modified IMP operator 626 and/or modified IMP operator 627). As a result of plan folding, the expressions evaluated by the IMP operators in the IMP sub-plan 628 may work seamlessly on a composite CQ tuple. In some embodiments, an IMP operator may access the attributes of an input tuple directly and not through an expression evaluator. In such situations, the adapter IMP operator 732 may project a composite CQ tuple into a traditional tuple (e.g., a row of data) so that it may be evaluated by the IMP sub-plan 628.

When the CQ operator 728 is called by the tuple router 134 with a new CQ tuple, the CQ operator 728 may evaluate the logic (e.g., determine if a window edge has been triggered). The CQ operator 728 may deliver one or more tuples through the adapter IMP operator 732 to the IMP sub-plan 628. For example, the CQ operator 728 may buffer the CQ tuple in a local state. The CQ operator may call the next( )method on the root (e.g., modified IMP operator 625) of the IMP sub-plan 628.

Examples of IMP operators for which the plan folding module 132 may generate a plan item include stream scans, stream to relation scans (StoR scans), subquery scans, a join that involves streams, aggregations, and results.

A plan item for a shared stream to relation (StoR) scan may be created for each StoR scan in the IMP. Such a StoR scan may exist for a windowing clause in the query and can be a parent of either a stream scan or a subquery scan. A StoR scan can be inserted for a windowing clause that is specified in a query. A StoR may receive tuples from a Stream Scan or a result of a subquery or a view. In some embodiments, StoR scan folding includes:

creating a new StoR Scan plan item.

capping a varno transform for a query block that was created while folding a shared scan child of the StoR scan.

adding a varno transform from an underlying shared scan's scanrelid to the varno of the new StoR plan item. All references to the vars which were coming from the scan depending from the StoR may be changed to reference the StoR scan. The added transform may be effective from root of the plan tree to the new StoR scan item. This may be referred to the capping the varno transform above effective below this node.

A streaming sub-plan is an IMP sub-plan that includes either a stream scan as a leaf node, or with a subquery scan whose sub-plan is a streaming sub-plan. If the sub-plan rooted at the subquery scan is streaming sub-plan, the folding for a query block that is appended to a subquery scan operator may be performed as if the subquery scan operator were a top level query block. The transform (varno and attno) information generated for the sub-plan may be appended to a global list of variable transforms. For example, the tuple router 134 may route a CQ tuple output from the CQ operator 234 to the CQ operator 233 or, alternatively, the CQ operator 728.

A plan item for a mixed join may be created for a join operator whose outer sub-plan is a streaming sub-plan and whose inner sub-plan is not a streaming sub-plan. Mixed joins may be used to add a new heap tuple component to a CQ tuple. The heap tuple component may be a join heap tuple with a target list that includes variables (e.g., varno and/or attno) from the outer and the inner side of the join. The heap tuple component may be augmented to the incoming CQ tuple.

A plan item for a shared aggregation maybe created for either an aggregation or for an aggregation having a child operator that is one of a Unique operator, a Sort operator, a Limit operator (used to implement top-k functions), and/or a Group operator. An aggregation node combined with zero or more of these plan nodes may comprise an aggregation chain. The plan item may be created for the entire aggregation chain.

A plan item for a shared result may be created when a result operator is encountered. Alternatively, a plan item for a shared result may be created when a result operator is a parent operator of (sitting on top of) one or more of IMP operators including a Unique operator, a Sort operator, a Limit operator, and a Group operator. A result operator combined with zero or more of these IMP operators may comprise a result chain. The plan item may be created for the result chain. Result operators can be a parent operator of an IMP, or introduced in the middle of a query block for projection purposes. Transformations may not be necessary for a top level result operator.

Figure 8:
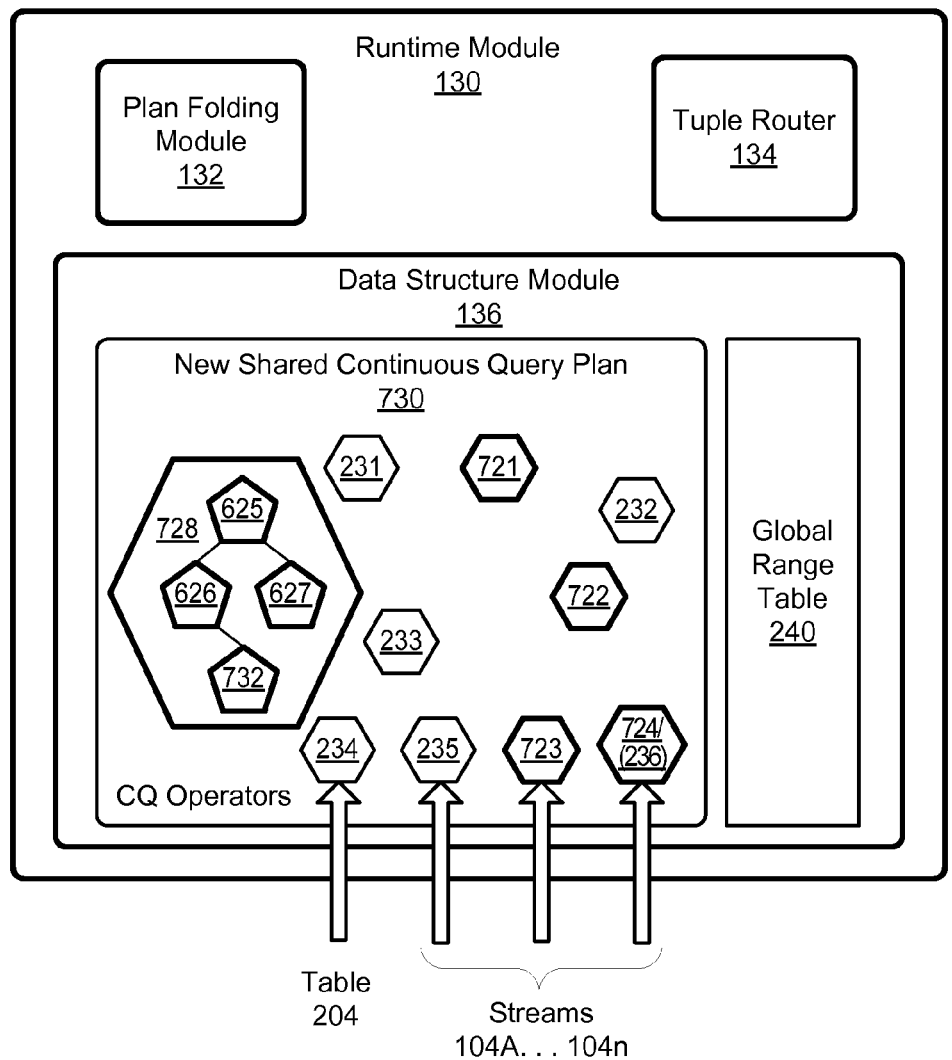
FIG. 8 illustrates a block diagram of a new shared continuous query plan of FIG. 7.

FIG. 8 illustrates a block diagram of the runtime module 130 after plan folding. The data structure module 136 includes the new shared continuous query plan (SCP) 730 of FIG. 7. At this juncture, following the transform illustrated in FIG. 7, the SCP 230 has become the new SCP 730. The transformed IMP 620 and the plan item list 630 may be discarded from the data structure module 136. The new SCP 730 differs from the SCP 230 in that the new SCP 730 includes the new CQ operators 721-723 and a new CQ operator 728 that incorporates IMP sub-plan 628 (i.e., the modified IMP operators 625-627 and the optional adapter IMP operator 732). The new SCP 730 may include a shared CQ operator 724 instead of the CQ operator 236. The CQ operator 724 shares the new query in addition to other queries that it already processes.

Figure 9:
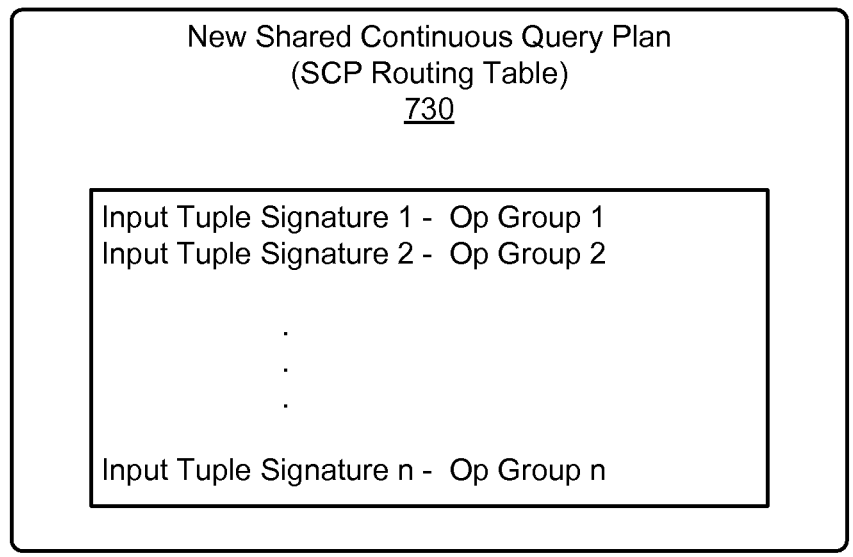
FIG. 9 illustrates an alternative representation of a new shared continuous query plan

FIG. 9 illustrates an alternative representation of the new shared continuous query plan (SCP) 730 of FIG. 7. In some embodiments, the new SCP 720 may be represented as a routing table that encodes the various possible routes for CQ tuples in a shared dataflow. The routing table may be implemented as a hash table that maps CQ tuple signatures to an OpGroup (i.e., a group of CQ operators that are intended recipients of the CQ tuple).

Figure 10:
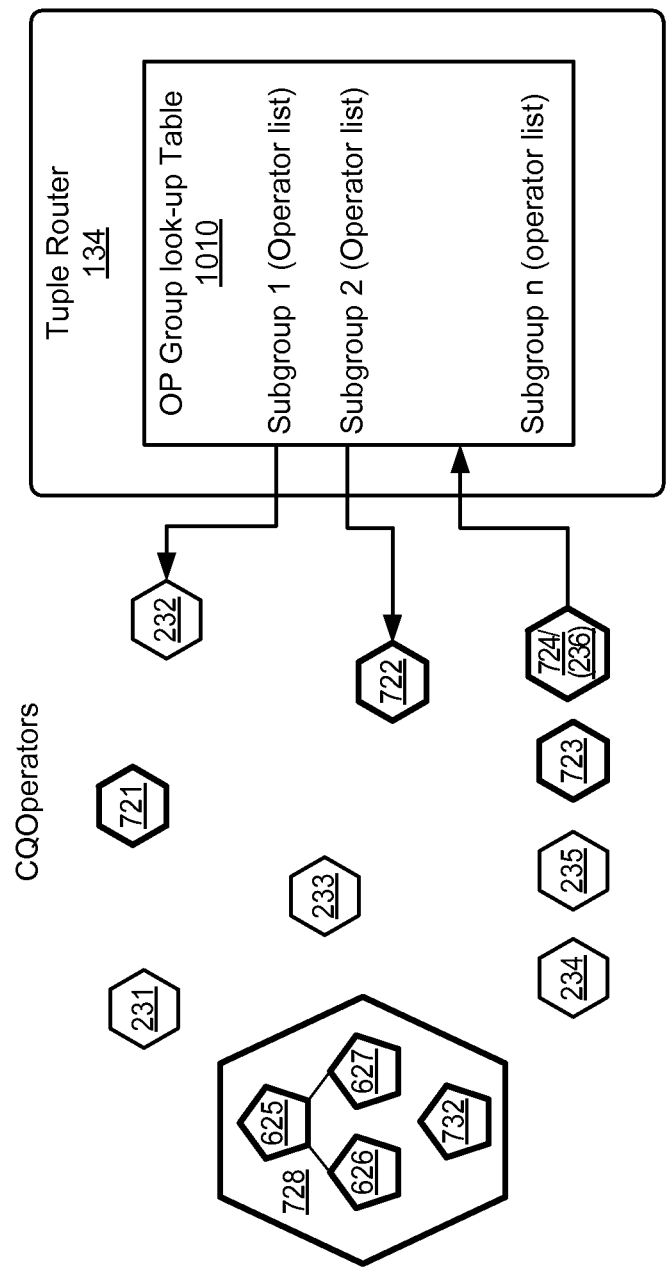
FIG. 10 illustrates a block diagram of a tuple router.

FIG. 10 illustrates details of a tuple router 134. The tuple router 134 includes a set of instructions e for routing CQ tuples through a DAG (or network) of CQ operators (e.g., CQ operators 231-234, 721-727, and CQ operator 728). Unlike a traditional IMP executor which processes tuples through a static fixed dataflow, the tuple router 134 processes CQ tuples through an adaptive dataflow where successive CQ tuples with identical signatures can take different paths through the network of CQ operators. Thus, one function of the tuple router 134 is to lookup a CQ operator corresponding to the signature of a CQ tuple and route the CQ tuple to a corresponding CQ operator.

The tuple router 134 is free to route a CQ tuple to the CQ operators in any order or based on any policy. A particularly effective policy is a lottery scheduling based approach that favors more efficient operators (i.e., those that eliminate a CQ tuple early in a dataflow).

In some embodiments, the tuple router 134 may route the CQ tuple to multiple CQ operators. In some embodiments, multiple operators are grouped into a set of ordered subgroups based on a set of precedence rules. As part of the routing process, the tuple router 134 applies these precedence rules and routes the CQ tuple to CQ operators having a higher priority before routing the CQ tuple to CQ operators having a lower priority in the subgroup. For example, the CQ operators 723, 233, and 721 may be grouped into a subgroup, the CQ operator 233 having a higher priority than the CQ operator 721. The tuple router 134 may route a CQ tuple from the CQ operator 723 to the CQ operator 233 and then to the CQ operator 721.

In some embodiments, the tuple router 134 operates in a single thread of control orchestrated in a major loop. In each iteration of the major loop, the tuple router 134 selects a leaf node that is typically a SharedScan operator (e.g., the CQ operators 234, 235, 723, or 724) and executes the operator by calling its exec( ) method. The leaf node may produce an appropriate output CQ tuple by accessing an input queue. The leaf node may then call on the tuple router 134 to further route an output CQ tuple to other CQ operators in the new SCP 720.

Figure 11:
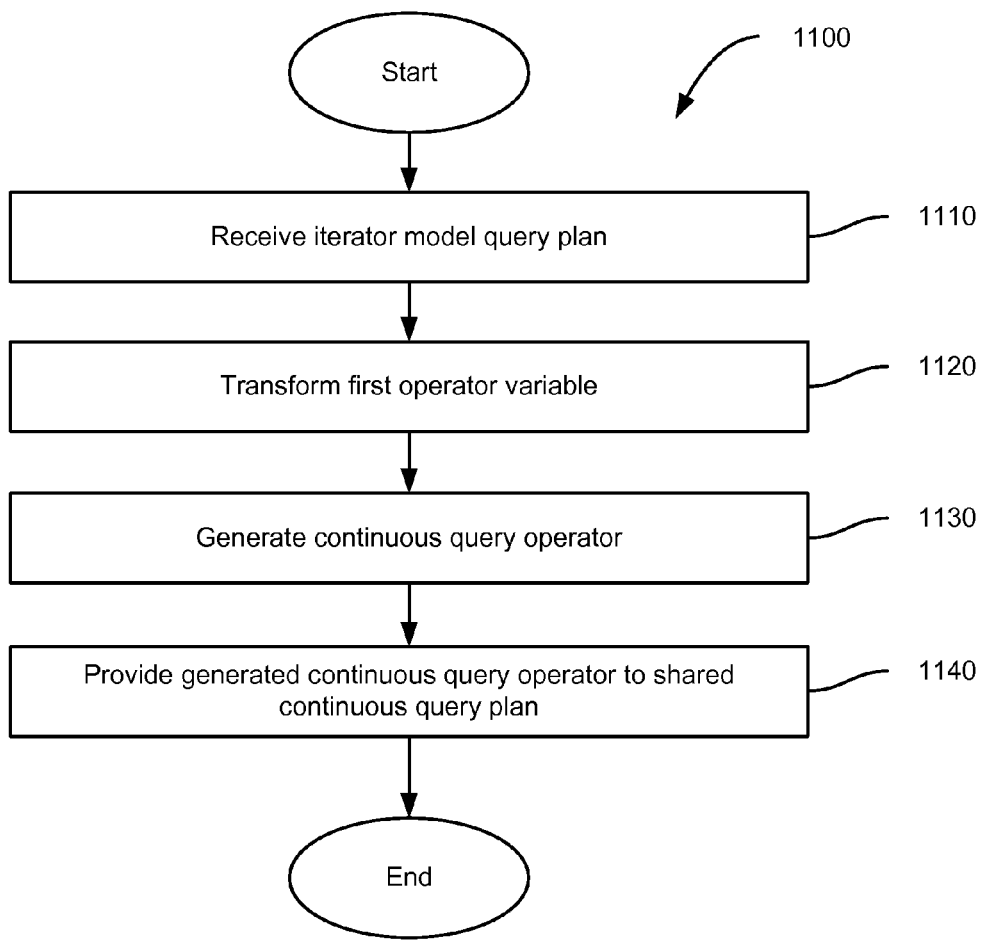
FIG. 11 illustrates a flow diagram of a method for folding a new query into a shared continuous query plan.

FIG. 11 illustrates a flow diagram of an exemplary method 1100 for folding a new query into a shared continuous query plan. In step 1110, a module (e.g., the runtime module 130) receives via a computer readable storage medium (e.g., the disk 118 or the optimizer of the egress backend 114) an IMP based on a new query. In step 1120, the module transforms, through the computer readable storage medium, an operator of the IMP and an operator variable of the operator based on an analysis of the IMP and a SCP. In step 1130, the module generates a CQ operator based on the transformed operator variable and the transformed operator. In step 1140, the module provides the generated CQ operator to the SCP.

Figure 12:
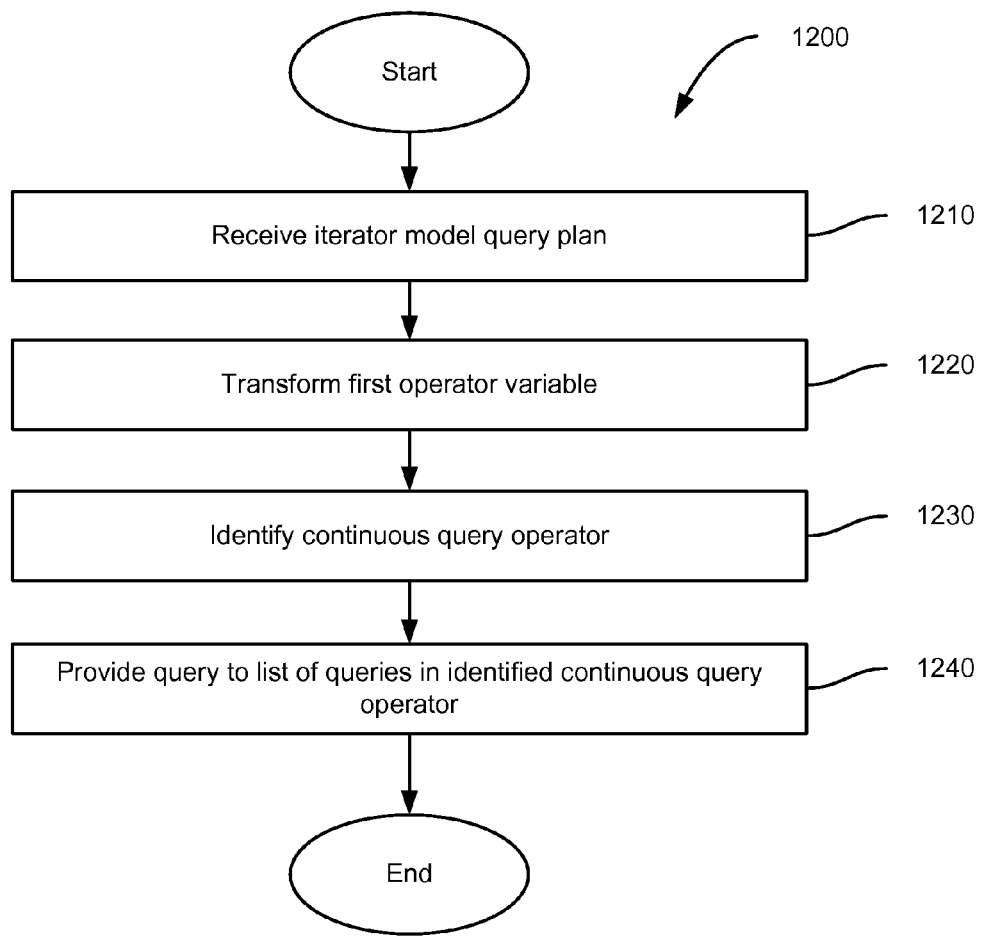
FIG. 12 illustrates a flow diagram of an alternative method for folding a query into a shared continuous query plan.

FIG. 12 illustrates a flow diagram of another exemplary method 1200 for folding a new query into a shared continuous query plan. In step 1210, a module (e.g., the runtime module 130) receives via a computer readable storage medium (e.g., the optimizer of the egress backend 114) an IMP based on the query. In step 1220, the module transforms, through the computer readable storage medium, an operator of the IMP and an operator variable of the operator based on an analysis of the IMP and a SCP. In step 1230, the module identifies a CQ operator based on the transformed operator variable and the transformed operator. In step 1240, the module provides the query to a list of queries associated with the identified CQ operator.

For simplicity, the names of various data structures and components from the PostgreSQL RDBMS are used in this disclosure. However, these data structures and components may be referred to elsewhere under other names and terms that are well known by persons having ordinary skill in the art.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for managing a new continuous query that includes folding a new continuous query into a shared continuous query plan (SCP) associated with a global range table, the method comprising:
   receiving via a computer readable storage medium a new continuous query;
   compiling the new continuous query to generate an iterator model plan (IMP) and an associated local range table that includes a list of range variables, each of which uniquely identifies an object in the new continuous query, and wherein the IMP corresponds to an execution plan generated for the new continuous query and comprises one or more IMP operators, each of which includes one or more expressions whose variables are associated with the local range table;
   analyzing the one or more IMP operators of the IMP and one or more SCP operators of the SCP to produce one or more variable transforms and one or more plan items;
   wherein the one or more variable transforms modify the one or more expressions of the one or more IMP operators by associating the one or more IMP operators with variables of a global range table;
   wherein the one or more plan items comprise one or more groups of the one or more IMP operators;
   applying the variable transforms to modify the variables of the one or more iterator model plan IMP operators;
   generating a continuous query operator based on each plan item included in the one or more plan items; and
   providing the generated continuous query operator to a shared continuous query plan.

2. The method of claim 1, further comprising providing the generated continuous query operator to a routing table.

3. The method of claim 1, wherein a structure of the iterator model plan is independent of how the iterator model plan is folded into the shared continuous query plan.

4. The method of claim 1, wherein a continuous query operator of a modified iterator model plan operates on a stream.

5. The method of claim 1, wherein the operators of the modified iterator model plan includes any of a scan operator, a unary operator, a binary operator, or an n-ary operator.

6. The method of claim 1, wherein operator of the modified iterator model plan are configured to perform any of an initialization function, a next function, a rescan function, a close function, and combination thereof.

7. The method of claim 1, wherein the continuous query operator is configured to perform at least one of an initialization function, an execute function, an add query function, a remove query function, and an end function.

8. The method according to claim 1, further comprising producing for each variable transform, instructions to re-target variables in an iterator model plan sub-plan from the local range table to the global range table.

9. The method according to claim 1, further comprising producing for each plan item a new continuous query operator to be added to the shared continuous query plan based on an iterator model plan sub-plan.

10. The method according to claim 1, further comprising applying each variable transform to operators in an iterator model plan sub-plan by evaluating the produced instructions.

11. The method according to claim 1, further comprising:
    generating a continuous query operator; and
    copying the associated transformed iterator model plan sub-plan.

12. A system for new continuous query that includes folding a new continuous query into a shared continuous query plan (SCP) associated with a global range table, the system comprising:
    a processor; and
    a computer readable storage medium having instructions for execution by the processor which causes the processor to:
    receive a new continuous query;
    compile the new continuous query to generate an iterator model plan (IMP) and an associated local range table that includes a list of range variables, each of which uniquely identifies an object in the new continuous query, and wherein the IMP corresponds to an execution plan generated for the new continuous query and comprises one or more IMP operators, each of which includes one or more expressions whose variables are associated with the local range table;
    analyze the one or more IMP operators of IMP and one or more SCP operators of the SCP to produce one or more variable transforms and one or more plan items;
    wherein the one or more variable transforms modify the one or more expressions of the one or more IMP operators by associating the one or more IMP operators with variables of a global range table;
    wherein the one or more plan items comprise one or more groups of the one or more IMP operators;
    apply the variable transforms to modify the variables of the one or more IMP operators;
    generate a continuous query operator based on each plan item included in the one or more plan items; and
    provide the generated continuous query operator to a shared continuous query plan.

13. The system of claim 12, wherein the processor is further configured to transform the operator variable based on the local range table and a global range table.

14. The system of claim 12, wherein the continuous query operator is configured to execute a list of queries, the list of queries including the new continuous query.

15. The system of claim 12, wherein the continuous query operator includes an input signature and an output signature.

16. The system of claim 12, wherein the continuous query operator includes a pointer to a routing table.

17. The system of claim 12, wherein the identified continuous query operator comprises a sub-plan including a group of two or more related operators of the iterator model plan.

* * * * *